Aug. 28, 1962    H. M. MONTGOMERY    3,051,539
TRUCK DRIVER'S DAILY LOG BOOK HOLDER
Filed March 21, 1960    2 Sheets-Sheet 1

INVENTOR.
HENRY M. MONTGOMERY
BY John H. Widdowson
ATTORNEY

Aug. 28, 1962 H. M. MONTGOMERY 3,051,539
TRUCK DRIVER'S DAILY LOG BOOK HOLDER
Filed March 21, 1960 2 Sheets-Sheet 2
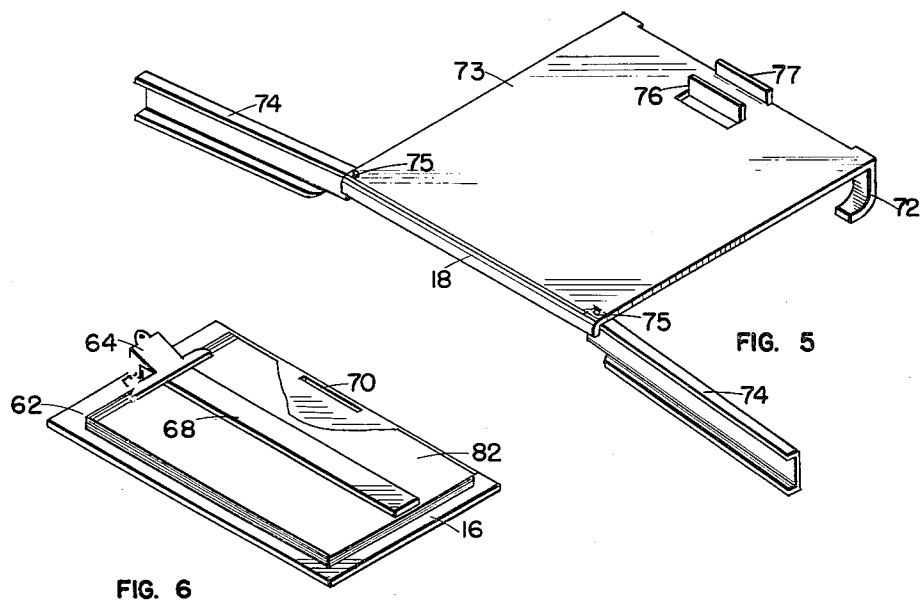
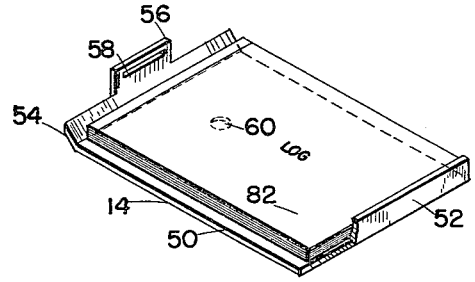
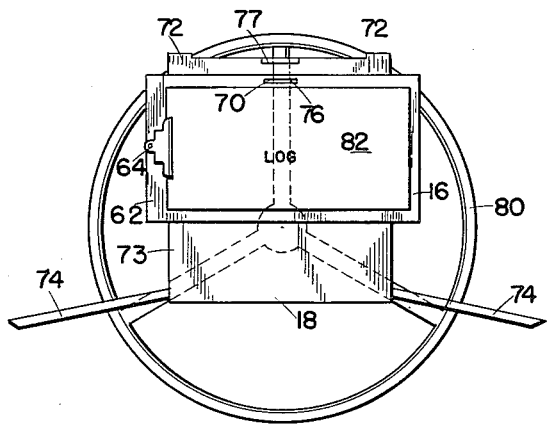
*INVENTOR.*
HENRY M. MONTGOMERY
BY John H. Widdowson
*ATTORNEY*

United States Patent Office 3,051,539
Patented Aug. 28, 1962

1

3,051,539
TRUCK DRIVER'S DAILY LOG BOOK HOLDER
Henry M. Montgomery, 1115 S. Ash, Wichita, Kans.
Filed Mar. 21, 1960, Ser. No. 16,516
3 Claims. (Cl. 312—231)

This invention relates to a log book holder, and more particularly to a log book holder for maintaining daily log books by a truck driver.

The rules and regulations of the Interstate Commerce Commission require, among other things, that all trucks moving in interstate commerce make and retain a daily log showing the hours the truck driver has been on duty, the miles driven, stops made, etc. This log must be kept current during operation of the vehicle, and a copy must be sent daily to the carrier. Another copy of the log must be retained in the truck for a total of 30 days for inspection by officers of the Interstate Commerce Commission. Carrying blank copies of the log as well as completed daily logs has been a problem to truck drivers for some time. Some of the drivers have tried to keep the log books in the glove compartment of the cab of the vehicle but these compartments are usually full of tools, gloves, and other necessary articles required during the trip. Furthermore, many of the new models of trucks do not have a glove compartment. As a result the logs are usually kept loose in the cab of the truck and are often lost or misplaced. When a truck is stopped by an officer of the Interstate Commerce Commission who finds the log is not being kept properly, or records for the previous 30 days are missing, both the truck driver and the carrier are liable for the infraction and subject to a penalty. Thus it is apparent that a need has long existed in the art for some means of carrying and retaining in the cab of the truck blank forms and completed daily logs having the required information. At the same time, since the regulations require the log to be in the cab of the truck at all times, a further need has existed for some means of providing a suitable table or structure on which the logs can be filled out. The hereinbefore mentioned problems have been solved by the present invention.

In accordance with the invention, a housing has been provided which can be secured to the top of the inside of the cab of the truck. The housing is preferably divided into compartments or sections, in which a folding desk-like structure, a shelf and a clipboard are stored. A folding lid on the box-like housing provides easy access to the sections for removal of the articles therein.

Accordingly, it is an object of this invention to provide a new and improved truck driver's daily log book holder.

Another object of the invention is to provide a housing which is adapted to receive and retain therein a plurality of log book forms and which can be secured within the cab of the truck.

Another object of the invention is to provide a sectionalized housing which can retain therein a foldable table, a clipboard, and a drawer or shelf, and which can be easily opened for removal of the items therein.

Various other objects, advantages and features of the invention will become apparent from the following description taken in connection with the accompanying drawings, in which:

FIG. 5 is an iso-metric view of the pad or book holder

Figure 1:
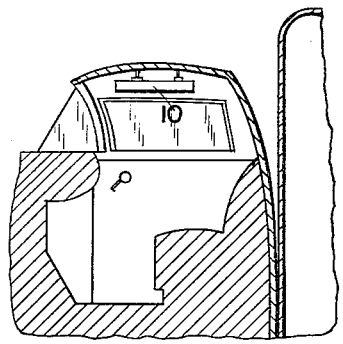
FIG. 1 is a cross section view through the cab of a truck showing the device mounted therein.

2 with the wings folded out in position for mounting on a steering wheel.

FIG. 6 is an iso-metric view of the clipboard and rule showing a book mounted in place thereon.

FIG. 7 is an iso-metric view of the drawer for storing pads with the housing.

FIG. 8 is a top plan view of the book holder mounted on a steering wheel showing the clipboard with a pad thereon mounted on the holder.

The following is a discussion and description of a preferred specific embodiment of the truck driver's log book holder of the invention, such being made with reference to the drawings whereon the same reference numerals are used to indicate the same or similar parts and/or structure. It is to be understood that such discussion and description is not to unduly limit the scope of the invention.

Referring now to the drawings in detail, the truck driver's daily log book holder is shown generally at 10 and includes a sectionalized box-like housing 12 in which a drawer 14 is mounted along with a clipboard 16 in one section, and a book holder 18 is received in the other section.

Figure 2:
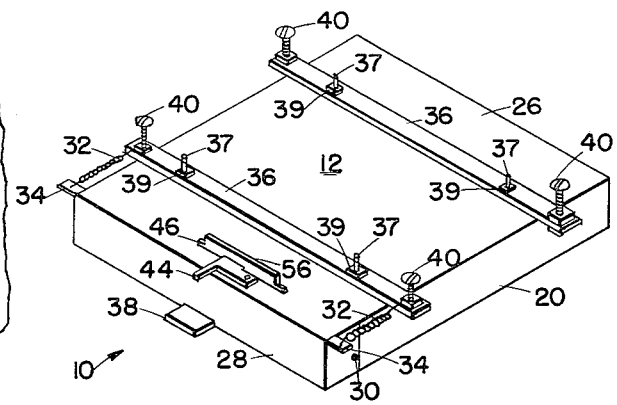
FIG. 2 is an enlarged iso-metric view of the storage case or housing of the device.

The housing 12 is a rectangular box-like structure, preferably made of a suitable metallic material, and is divided interially into two main sections. The sides 20 of the housing have their bottom portions bent inwardly as shown at 22 (FIG. 4) to form a supporting ledge on which the book holder 18 is received and retained within the housing 12. The back end 24 and the top 26 are secured to or formed integral with the sides 20. The front end of the housing 12 is closed by a door 28 which is pivotally mounted on the sides 20 by a pivot 30. The door is preferably spring loaded by a two way or double acting spring 32. By a two way or double acting spring it is meant one which is so mounted in relation to the door as to urge it into either the open or closed position. One end of each of the springs 32 is secured to a flange 34 projecting from each side of the door 28, and the other end of each of the springs 32 is secured to one of two elongated bars 36 which are mounted on the top of the housing 12. With the door 28 in the closed position as shown in FIG. 2 the springs 32 will maintain the door tightly closed. To open the door 28, finger pressure is applied to a flange 38 extending from the lower edge of the door which urges the door about pivot 30. The springs 32 will move along the sides 20 of the housing 12 and after they pass the axis of the pivot 30 they will then urge the door 28 into the open position.

The bars 36 on the top of the housing 12 are apertured to receive suitable mounting means, such as the bolts 40 and nuts 41. The bolts 40 can be pressed through mounting apertures in the top of the cab of a truck as shown in FIG. 1 to permanently mount the truck driver's daily log book holder in place within the truck. Other mounting means can, of course, be used. Also the device can be mounted in other positions within the truck as will be apparent to those skilled in the art. The bars 36 are secured to the top 26 of the housing 12 by any suitable means, such as by the screws or bolts 37 passing through apertures in the top 26 of the housing and received and secured by nuts 39.

A latch 44 is pivotally mounted on the top 26 of the housing 12 near the door 28. An elongated slot 46 is provided adjacent to the latch 44 and approximately parallel to the front edge of the door 28 for a reason to be explained in detail hereinafter.

Figure 3:
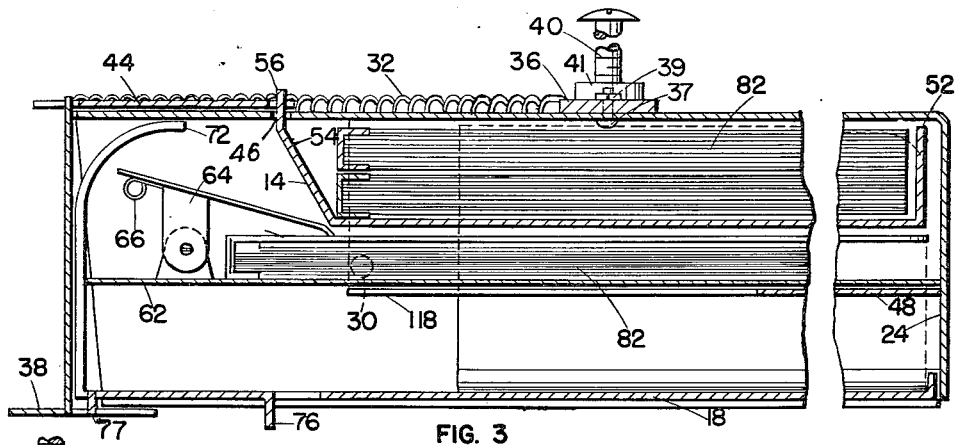
FIG. 3 is an enlarged partial longitudinal cross section view showing the articles in the housing.
Figure 4:
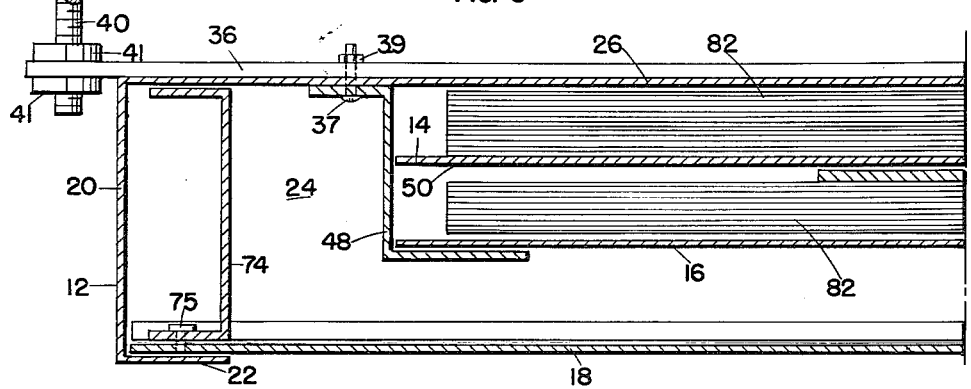
FIG. 4 is a partial transverse cross section view of the device.

The inside of the housing 12 is divided into two main sections by a suitable divider 48 which can be retained in place by the screws 37 and nuts 39 which mount the bars 36 on the top of the housing. The divider 48 is spaced from both of the walls or sides 20 and is also spaced from the flanges 22 which form the bottom portion of the housing. The divider 48 can have the center of its bottom portion removed as shown in FIGS. 3 and 4. This not only reduces the total amount of material necessary to form the device, but also provides access to the material within the smaller or inner section. Also, as shown in FIG. 3, the divider 48 need not come to the front or door 28 of the housing.

The smaller or upper section of the housing 12 formed by the divider 48 receives and retains therein the drawer 14 and clipboard 16 shown in detail in FIGS. 6 and 7. The drawer 14 is preferably formed from a single piece of metal and consists of a bottom 50, a back portion 52 bent at approximately 90 degrees therewith, and a front portion 54. The front portion 54 is inclined at an angle of approximately 45 degrees to the bottom 50 and has a narrow projecting portion 56 which is bent at approximately 45 degrees to the front 54 and is approximately perpendicular to the bottom 50 of the drawer. The projecting portion 56 is dimensioned so as to be extendable through the slot 46 in the top 26 of the housing 12. A slot 58 is cut through the projecting portion 56 of the drawer and receives the latch 44 on the top of the housing to retain the drawer 14 in position in the housing. The back 52 of the drawer is freely mounted within the housing. A small opening 60, FIG. 7, can be cut in the bottom 50 of the drawer 14 to facilitate its removal from the housing 12.

The clipboard 16, which is also received in a smaller section of the housing 12 along with the drawer 14, is shown in FIG. 6. The clipboard consists of a flat preferably metallic plate 62 on which a clip 64 is mounted. The clip 64 is spring biased in the usual manner by a spring 66 to continually urge one end of the clip 64 into contact with the metal plate 62. A metal rule 68 is preferably included with the combination and is used by the truck driver to rule the pads mounted on the clipboard. One edge of the metal base 62 to the clipboard 16 has an elongated aperture 70 therein approximately parallel to the edge of the clipboard for reasons to be explained hereinafter.

The other section of the housing 12 receives and retains therein the book holder 18. The holder 18 has two integral hooks 72 formed at opposite edges on one side of the flat work surface 73 of the holder. The other two edges of the generally rectangular surface 73 have mounted thereon foldable wings 74. The wings 74 are pivotally mounted by pivots 75 on the holder so that they can be folded underneath the holder and inserted into the housing 12 as shown in FIG. 4. The wings 74 are preferably channel shaped as shown in the drawings, however other shapes can be used without departing from the scope of this disclosure. Two elongated relatively narrow projections 76 and 77 respectively extend from the surface of the holder 18 between the two hooks 72. The elongated aperture 70 of the clipboard and the projection 76 of the holder 18 are so dimensioned relative to each other that the projection 76 can be received in the opening 70 to mount the clipboard 16 firmly in place on the holder 18 as shown in FIG. 8. When mounting the holder 18 in the housing 12, the wings 74 are folded as previously explained and the holder is inverted and reversed from the position shown in FIG. 5, and is inserted in the housing as shown in FIG. 3. The projection 77 on the holder 18 has been provided to facilitate removal of the holder from the housing. Thus, when the door 28 is opened the projection 77 can readily be grasped to remove the holder 18.

In operation, the book holder 18 is removed from the housing and the wings 74 are extended to the position shown in FIG. 5. The holder 18 is then mounted on a steering wheel 80 as shown in FIG. 8. The hooks 72 engage portions of the wheel 80 as do the wings 74 to provide the flat working surface 73. With the holder 18 in this position, the clipboard 16 is removed from the smaller section of the housing and positioned on the holder 18 by the aperture 70 in the clipboard receiving the projection 76 of the holder. A log book 82 is held on the clipboard 16 by the spring biased clip 64. The truck driver can then fill in the log, using the rule 68 whenever necessary. When one log book 82 has been completed, the drawer 14 is removed from the housing by moving the latch 44 about its pivot so that the projecting portion 56 of the drawer is released. The drawer is then removed from the housing and the used log book 82 is substituted for a new log book 82 which has been stored in the drawer 14. Space has been provided in the drawer 14 for two full log books, so that there is always one blank book there, as well as space for the book completed during the last 30 days.

When the log has been completed, the drawer is inserted into the smaller or upper section of the housing, the portion 56 is passed through the aperture 46 and the latch 44 passes through the slot 58. With the drawer thus in place the clipboard 16 is removed from the holder 18 and inserted in the upper or smaller section of the housing beneath the drawing 14. As the clipboard 16 is inserted into the housing, it will urge the freely mounted rear end 52 of the drawer 14 upwardly into its proper position. The book holder 18 is then removed from the steering wheel 80 and the wings 74 folded under the surface 73. With the wings thus folded the device is inserted into the lower or larger section of the housing 12 so that the hooks 72 are adjacent to the door 28 and the ends of the hooks are in the up position. The door 28 is then rotated about the pivot 30 and is urged into its closed position by the springs 32.

As will be evident from the foregoing description, the objects of the invention as set forth have been achieved by the structure described. The new daily log book holder has compartments for the storage of various members to provide a table or flat working surface as well as a clipboard and a storage drawer. Also, while the invention has been described in connection with a preferred embodiment thereof, it will be understood that this description is intended to illustrate and not to limit the scope of the invention, which is defined by the claims.

It will be evident to those skilled in the art that various modifications of the invention can be made, or followed, in the light of this discussion and description without departing from the spirit of the disclosure or the scope of the claims.

I claim:

1. A truck driver's daily log book maintenance device comprising, in combination, a rectangular boxlike metallic housing, means for securing said housing in the top of the cab of a truck on the inside thereof, a latch pivotally mounted on the top of said housing adjacent a slot in said housing, a door closing one end of said housing, said door being pivotally mounted and spring loaded by a two-way spring to retain the door in either the open or the closed position, a drawer, a book holder having a flat work surface, and a clipboard, the inside of said housing being divided into two main sections, one of said sections being of size to removably receive said clipboard and said drawer for storing record books therein, the other of said sections adapted to receive and retain therein said book holder, said holder having integral hooks formed at opposite edges of one side thereof and pivotally mounted foldable wings at each edge of the opposite side thereof, an elongated relatively narrow projection extending from the flat surface of said holder, said projection being formed intermediate said hooks, said clipboard adapted to receive and retain a daily log book thereon, an elongated aperture near one side of said clip board slightly longer than and adapted to receive said projection of said book holder, said drawer having a front and a back and said front having a projecting portion having a slot therein, said projecting portion of said front of said drawer extendable through said slot in the top of said housing with said slot in said drawer portion receiving said latch to retain said drawer in said housing, and said device being constructed and adapted so that said housing can be secured to the cab of a truck on the inside of the top thereof and can retain therein said book holder in one of said sections of said housing and said clipboard and said storage drawer within the other compartment of said housing to provide space for storage and retention of a plurality of daily log books.

2. A truck driver's daily log book maintenance device, comprising, in combination, a metallic box-like housing, means for securing said housing in the cab of a truck, a slot in the top of the housing adjacent the front edge thereof, a latch pivotally mounted on the top of the housing near said slot, a spring loaded door pivotally mounted on said housing closing one end thereof, the inside of said housing having a divider therein forming two main sections, a drawer, a clipboard, and a book holder having a flat work surface, one of said sections in said housing being of such size to removably receive said clipboard and said drawer therein, the other of said sections adapted to receive and retain therein said book holder, said holder having integral hooks formed at opposite edges of one side thereof and wings pivotally mounted at opposite edges of the other side, a projection extending from the flat surface of said holder, said clipboard having an aperture in one side thereof and adapted to receive said projection on said book holder, said drawer having a projecting portion at the front side thereof having a slot therein, said projecting portion of said drawer extendable through said slot in the top of said housing to receive said latch to retain said drawer in said housing, said device being constructed and adapted so that said housing can be secured inside the cab of a truck and retain therein said book holder in one of said sections of said housing and said clipboard and said storage drawer in the other section of said housing to thereby retain a plurality of daily log books for ready use by a truck driver.

3. A log book maintenance device for a normally driven closed vehicle having a substantially circular steering wheel in an area therein for the driver comprising, in combination, a box-like housing having door means pivotally mounted on said housing closing one end thereof, said housing having mounting means therewith for securing said housing to the interior of the vehicle near the driver area with said door means in position for ready access to the inside of said housing, the inside of said housing having means therein dividing same into a plurality of sections, said door means being mounted and positioned to when open provide access to each of said sections, desk-type means having a flat work surface removably positioned in one of said sections of said housing, said desk-type means having means therewith to mount same on the steering wheel with said work surface facing the driver, board means having a flat work surface removably positioned in another of said sections in said housing and having clip means therewith to receive and hold a log book or the like thereon, said board means and said desk-type means having cooperating structure therewith to removably mount said board means in fixed position on said desk-type means when the latter is mounted on said steering wheel, and drawer means removably mounted in said housing and of size and construction to receive and hold therein a log book, said drawer means having means therewith structurally cooperating with said housing to maintain said drawer means in position in said housing out of the way of said desk-type means and said board means to provide for easy withdrawal of said desk-type and board means from said housing and insertion of said desk-type and board means into said housing.

References Cited in the file of this patent

UNITED STATES PATENTS

| | | |
|---|---|---|
| 302,774 | Polkinhorn | July 29, 1884 |
| 1,527,282 | Steadman | Feb. 24, 1925 |
| 1,529,482 | Hall | Mar. 10, 1925 |
| 1,951,261 | Thompson | Mar. 13, 1934 |
| 2,267,891 | Baker | Dec. 30, 1941 |
| 2,618,884 | Low | Nov. 25, 1952 |
| 2,749,655 | Ashton | June 12, 1956 |
| 2,820,687 | Waring | Jan. 21, 1958 |